A. FRY

ELECTRIC RESISTANCE FURNACE ADAPTED FOR HARDENING BY NITROGENIZATION

Nov. 18, 1930.

Original Filed Aug. 2, 1926

Re. 17,874

2 Sheets-Sheet 1

Inventor
Adolf Fry
By Knight Brothers
Attys

A. FRY

ELECTRIC RESTSTANCE FURNACE ADAPTED FOR HARDENING BY NITROGENIZATION

Nov. 18, 1930.

Original Filed Aug. 2, 1926

Re. 17,874

2 Sheets-Sheet 2

Inventor
Adolf Fry
By Kingsford & Co
Attys

Reissued Nov. 18, 1930 Re. 17,874

UNITED STATES PATENT OFFICE

ADOLF FRY, OF ESSEN-RUHR, GERMANY, ASSIGNOR, BY MESNE ASSIGNMENTS, TO THE NITRALLOY CORPORATION, A CORPORATION OF DELAWARE

ELECTRIC RESISTANCE FURNACE ADAPTED FOR HARDENING BY NITROGENIZATION

Original No. 1,661,694, dated March 6, 1928, Serial No. 126,650, filed August 2, 1926, and in Germany September 4, 1925. Application for reissue filed July 20, 1929. Serial No. 379,861.

The purpose of the invention is to provide an electrical resistance furnace for hardening metal articles by nitrogenization which is characterized by a simplicity of structure, and which can be disassembled to a large extent and attended in a very easy manner.

In order that the invention may be clearly comprehended, an example of one embodiment of the same will be described in detail with reference to the accompanying drawings which form a part of the specification. The embodiment herein illustrated discloses a resistance furnace operated by means of three phase current and designed to be used for hardening steel articles by nitrogenization.

In the above mentioned drawings wherein like characters of reference designate like parts throughout:

Figure 1:
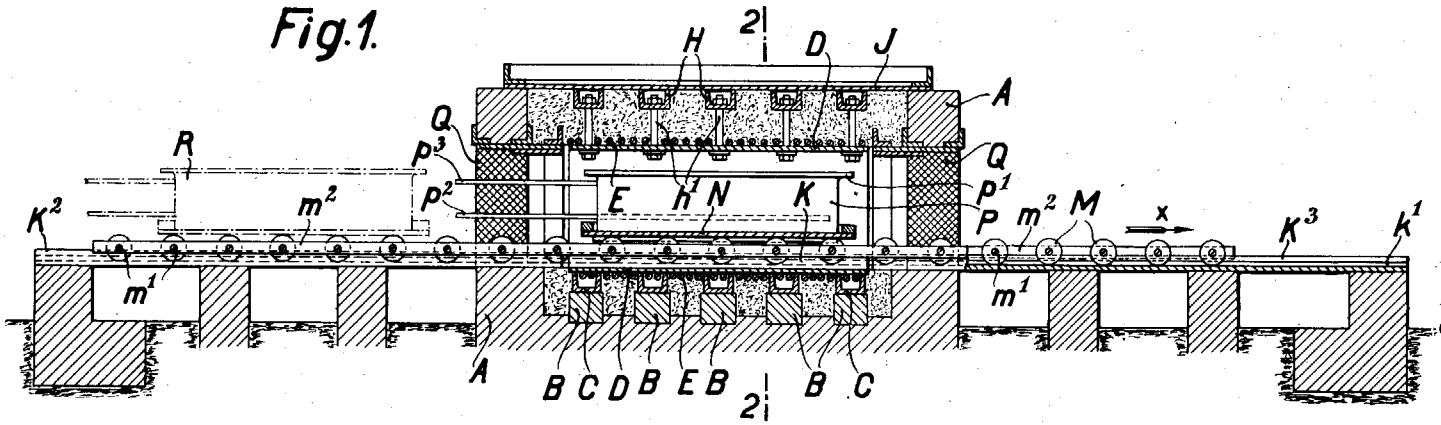
Fig. 1 is a sectional view taken longitudinally through the furnace.
Figure 2:
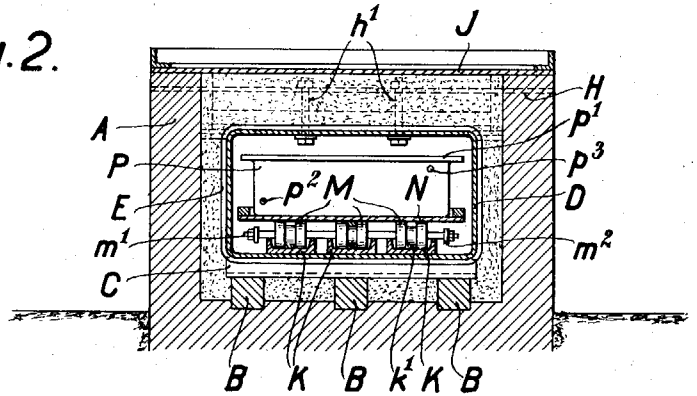
Fig. 2 is a transverse section taken on the line 2—2 of Fig. 1.
Figure 3:
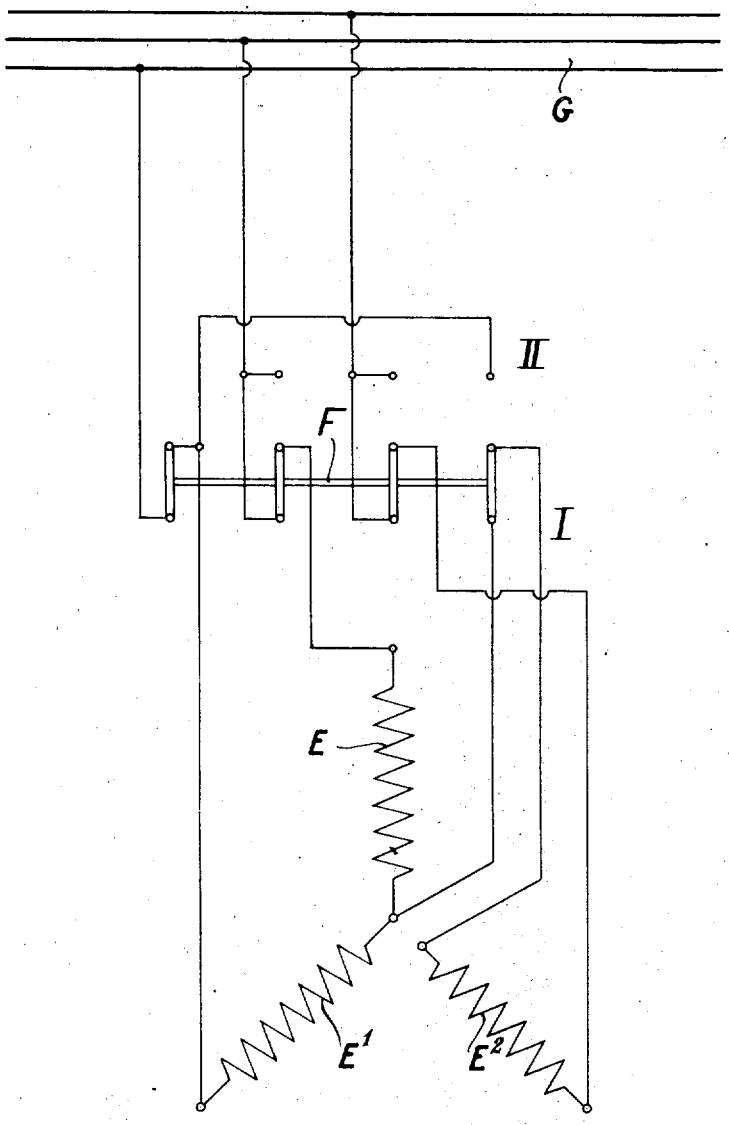
Fig. 3 is a diagrammatic view of the electrical connections employed in operating and maintaining the three phase current designed for use in connection with the present invention.

Referring to Figs. 1 and 2, the reference character A designates the brickwork of the furnace, and into the foundation of this brickwork a plurality of pillar blocks B of refractory material are built. These blocks B form supports for a box D which is rectangular in cross section and open at its ends and which rests on the blocks B by means of cross carriers C. The box D is made of a heat and corrosion-proof alloy. As a result of considerable research and experiment, it has been found that an alloy of chromium, nickel and iron is best adapted to perform the desired requirements; this alloy will be commonly referred to in this specification as chromium nickel steel. A steel alloy that has been found to be particularly suitable for this purpose comprises in a representative analysis chromium about 25%, nickel about 20%, silicon 0.8–1.0%, and carbon around 0.3%, the balance being principally iron. The box D is provided on its outer surface with insulators (not shown) carrying the heating resistance E, which is subdivided so as to form three phase windings. This resistance E is formed of chromium-nickel-iron wire. The windings are designated at E, $E^1$ and $E^2$, and the ends of the same, as may be seen in Fig. 3, are led out of the furnace through its wall and are so connected, by means of a four pole throw-over switch F, Fig. 3, to a three phase main G, that in the switch position denoted by I, star connection is established, and in position II series connection is established.

By means of suitable screw bolts $h^1$ the box D is suspended from cross carriers H which rest on the side walls of the brickwork. The furnace is covered on the top by an iron cover plate J loosely resting on the brickwork A and after the removal of this plate the box D together with the carriers H may be removed as a whole. The hollow spaces existing between box D and brickwork A and cover J are filled with kieselguhr or a similar heat insulation, as shown in Figs. 1 and 2.

The box D is fitted with a track which consists of three rails K, which are U-shaped in cross section as may be seen in Fig. 2. These rails are riveted to the floor of the box and each is provided with a guide rod $k^1$. Similar tracks $K^2$ and $K^3$ projecting into the box D through the front and rear openings of the furnace form prolongations of the tracks K, at both sides of the box, and are arranged outside the furnace in the manner shown in Fig. 1.

A system of loose double rollers M is adapted to run on the rails K, $K^2$, $K^3$, said rollers being interconnected by axles $m^1$ and lateral frame-plates $m^2$ so as to form a moving platform. The length of the whole roller system M, $m^1$, $m^2$ is about two and one-half times the length of the furnace.

A receptacle P, adapted to receive the articles to be nitrogenized, is removably supported within the heating chamber formed by the box D. The receptacle has a bottom plate N which is supported on the loose rollers M, and suitable means, such as wire, rope or the like, may be attached to the receptacle to permit removal of the same from the furnace. The receptacle P is closed in a gas-tight manner by a cover $p^1$ and is made of a chromium nickel steel alloy having a particularly high resistance to heat and chemical influences. A pipe $p^2$ for supplying nitrogen or a nitrogenous gas to the receptacle P passes through one of the end walls and extends nearly up to the opposite end wall thereof. A pipe $p^3$ passing through the same end wall serves to lead off the gas. A second, similar receptacle R is shown as resting outside the furnace on that portion of the moving platform M, $m^1$, $m^2$ which rests on the track portion denoted by $K^2$.

The heating chamber of the furnace is closed to the outside atmosphere by loose walls Q which have to be removed before the receptacle P is entered.

In actual operation when the furnace, still empty but closed by the loose walls Q, has been heated up by connecting the resistances E, $E^1$, $E^2$ to the three phase main G with the throw-over switch F in position I (star connection), the switch F is turned over into position II, in which the phase windings take only so much current as is sufficient to maintain the temperature attained by the heating-up operation. The receptacle P which has been filled in the meantime with the articles to be hardened and closed in a gas-tight manner, is then entered, after removal of the loose walls Q, into the heating chamber of the furnace. When this takes place, the moving platform displaces itself with half the speed of the receptacle P. After the pipes $p^2$ and $p^3$ have been connected to a bottle containing the nitrogenous gas, the furnace is closed again by the loose walls Q. The nitrogenous gas is thereupon supplied to the receptacle P heated by means of the resistances E, $E^1$, $E^2$. During this operation nitrogen penetrates the articles to be hardened and hardens them. During the period of nitrogenization the second receptacle R, is put on the track portion $K^2$ and filled with articles to be hardened. As soon as a sufficient quantity of nitrogen has been supplied to the articles contained in receptacle P and receptacle R has been filled, the loose walls Q are removed. The receptacle P is thereupon shifted in the direction of arrow $x$, Fig. 1. This motion is taken part in by the moving platform with half the speed, and by the receptacle R with the speed of the receptacle P. When the receptacle R has reached the former position of the receptacle P, the latter, which now is outside the furnace, is brought to a standstill and the loose walls Q are brought into position again. This done, the articles contained in receptacle R are nitrogenized and receptacle P is emptied and refilled with articles to be hardened, so that it enters the furnace at the same time as the receptacle R leaves it. From this time the described operations may be repeated as often as desired. When the furnace is to be shut down, it is merely necessary to interrupt the current supply to throw the entire device out of operation.

The fact that the electrically heated body D is capable of receiving a shiftable receptacle enables a great number of articles to be treated at the same time and in a very easy manner. In comparison with receptacles running on wheels the arrangement of the receptacles P and R on the described roller system offers the very important advantage of the pulling in and out of the filled receptacles taking place in a very easy manner.

By making the heating box and the receptacles of a chromium nickel steel alloy or any other metal or alloy having a high resistance to heat and chemical influence, not only is the life of the heating box and of the receptacles increased, but also the catalytic conversion or decomposition of the gases delivering nitrogen which is caused by contact thereof with the heated materials customarily employed in forming the walls of heating furnaces of this type, is prevented. Metals or metal alloys of this kind are called herein metals having the properties of chromium nickel steel. Another important feature of the invention is the extension of the gas supply pipe nearly to the opposite end wall of the receptacle $p$, $p'$. This enables the gases entering the furnace to be gradually heated so that when they finally contact with the articles to be treated they have reached a preheated condition corresponding to the treating temperature desired.

The provision of removable covers for the receptacles offers the advantage, in comparison with the front wall closures heretofore used with resistance furnaces, that the articles to be treated may be more easily introduced to and withdrawn from the furnace, at the same time permitting them to be more carefully embedded.

It is to be distinctly understood that various changes may be performed in the details of construction of the apparatus without deviating from the spirit of the invention. For example, the furnace may be closed by sliding doors instead of loose walls; furthermore, the furnace may, if desired, be used for the cementation of steel or, in fact, for performing any kind of heat treatment of iron, steel or other metal articles.

I claim:

1. In an electric resistance furnace adapted for hardening metals by nitrogenization, a roller system, a nitrogenizing receptacle mounted thereon, and a removable electrically heated casing surrounding said receptacle and enclosing a portion of the roller system.

2. In an electric resistance furnace adapted for hardening metals by nitrogenization, a nitrogenizing receptacle movably mounted in the furnace, an electrically heated casing surrounding said receptacle, means extending through a major portion of the length of the furnace for passing a nitrogenous gas in heat-absorbing relation to said casing and receptacle and then delivering the same in a heated condition to the interior of said receptacle, and means for withdrawing residual gases from said receptacle at a point remote from the point of delivery thereto.

3. In an electric resistance furnace adapted for hardening metals by nitrogenization, a roller system, a nitrogenizing receptacle formed of a metal having the properties of chromium nickel steel as regards decomposition of nitrogeneous gases contacted therewith at nitrogenizing temperatures mounted thereon, an electrically heated casing surrounding said receptacle and enclosing a portion of the roller system.

4. In a furnace for hardening metals by nitrogenization, a nitrogenizing receptacle movably mounted in the furnace, a pipe extending through one wall of said receptacle to a point adjacent the opposite wall for introducing nitrogen, and means for leading residual gases from said receptacle through an opening in said first-mentioned wall.

Signed at Cologne, Germany, this 6th day of July, 1929.

ADOLF FRY.